United States Patent Office 3,249,612
Patented May 3, 1966

3,249,612
ACETYL AND HYDROXYETHYL BENZENE-
SULFONAMIDO-5-PHENYL-PYRIMIDINES
Harald Horstmann, Wuppertal-Vohwinkel, and Sophie
Wirtz, Wuppertal-Elberfeld, Germany, assignors to
Farbenfabriken Bayer Aktiengesellschaft, Leverkusen,
Germany, a corporation of Germany
No Drawing. Filed June 29, 1964, Ser. No. 378,952
Claims priority, application Germany, June 29, 1963,
F 40,114
2 Claims. (Cl. 260—256.5)

The present invention relates to organic chemistry, in general, and, in particular, to certain novel sulphonamides and to unique processes for the production of the same. More particularly, the invention relates to compounds of the general class described which are characterized by unique anti-diabetic activity and low toxicity, as compared with related compounds heretofore known in the art.

German Patent No. 1,147,948 describes certain benzene-sulphonamido-pyrimidines as represented by the general formula:

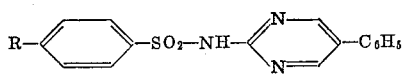

wherein R represents a member selected from the group consisting of hydrogen and chlorine atoms, or a methyl group. As also taught in the aforementioned German patent, these compounds are known to possess anti-diabetic activity.

The present invention is based, at least in part, on our discovery that sulphonamdies of comparable anti-diabetic activity, but with reduced toxicity, may be obtained when compounds represented by the general formula:

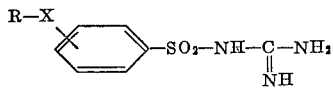

wherein R represents an alkyl radical with from 1 to 3 carbon atoms in chain length, and X is a keto group or the grouping —CH(OH)—, are reacted by methods known per se with the reaction products obtained by a Vilsmeir reaction from ω-alkoxy-styrenes and N,N-di-substituted formamides and inorganic acid chlorides, such as phosphorus pentachloride or phosgene, including for example, β-diethylamino-α-phenyl-acroleins or their acetals, etc., or with β-alkoxy-α-phenyl-acroleins or their acetals, or with β-chloro-α-phenyl-acroleins or their acetals, or with phenyl-malonic dialdehyde or its acetals, or when compounds of the general formula:

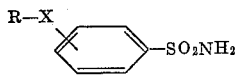

wherein R and X have the same meaning as defined above, are reacted, in the form of their salts or in the free state when acid-binding agents are also present, with 2-halo-geno-5-phenyl-pyrimidines; or when alkali metal salts of compounds of the general formula:

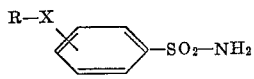

wherein R and X have the same meaning as defined above, are condensed with a trialkyl-(5-phenyl-pyrimidi-nyl-2)-ammonium salt, or when sulphonamides of the general formula:

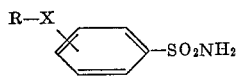

wherein R and X have the same meaning as defined above, are condensed with 2-nitroamino- or 2 - cyanoamino - 5-phenyl-pyrimidine, or when sulphonic acids of the general formula:

wherein R and X have the same meaning as defined above, are reacted by the method of Freudenberg with 2-acetyl-amino-5-phenyl-pyrimidines; or, provided that X is to represent the grouping —CH(OH)—, when compounds of the general formula:

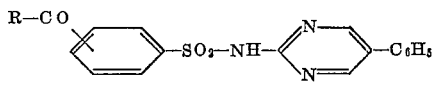

wherein R has the same meaning as defined above, are reacted with reducing agents such as catalytically activated hydrogen, LiAlH₄, Na in alcohol or NaBH₄ in water and in the presence of alkali metal hydroxides. In this connection, the preferred reducing agent is in accordance with the processes of the invention is NaBH₄. The amount of alkali metal hydroxide to be added must be at least sufficient to effect dissolution of the sulphonamide in the form of its salt.

Pursuant to the general teachings of the aforementioned German patent, the unique products produced via the processes of the invention are directly utilizable as therapeutic agents in the treatment of diabetes.

It is believed that the foregoing features and objects of the invention may be best understood by reference to the following specific examples illustrating the production of typical compounds of the invention.

*Example I*

Five (5) grams of phosgene were passed at —10° C., with stirring and cooling, into a solution of 4 grams of dimethyl-formamide in 100 milliliters of methylene chloride. Seven (7) grams of ω-methoxy-styrene were then added in dropwise fashion and the mixture was boiled for 8 hours with stirring. The reaction mixture was then neutralized by the addition of sodium methoxide, the separated sodium chloride was filtered off via suction, the methylene chloride was evaporated off in vacuo, and the residue was then introduced into a suspension of 10.1 grams of p-acetyl-benzene-sulphaguanidine (M.P. 216° C.) in 120 milliliters of methanol which contained 2.3 grams of dissolved sodium. It was boiled under reflux for 8 hours with stirring, and the solvent was then evaporated off. The residue was dissolved in water, unreacted p-acetylbenzene-sulphaguanidine was filtered off via suction, and the filtrate was acidified, whereupon the sulphonamide was precipitated.

For purification purposes, it was dissolved in dilute ammonium hydroxide solution, clarified with charcoal and reprecipitated with glacial acetic acid. The yield was 12.1 grams of 2-(4'-acetylbenzene-sulphonamide)-5-phenyl-pyrimidine of melting point 270° C.

*Example II*

2-amino-5-phenyl-pyrimidine, in amount of 17.1 grams, was dissolved in 80 milliliters of pyridine. p-Acetylbenzene-sulphochloride, in amount of 21.9 grams, was then introduced with stirring. Stirring was continued overnight, and the reaction mixture was then heated at 80° C. for 1 hour and introduced into ice-cold dilute hydrochloric acid. The precipitated sulphonamide was filtered off via suction, dissolved in dilute ammonium hydroxide solution, clarified with charcoal and reprecipitated with glacial acetic acid. Twenty-two (22) grams of 2-(4'-acetyl-benzene-sulphonamido) - 5 - phenyl-pyrimidine of melting point 268–270° C. were thus obtained.

Example III

Twelve (12) grams of 2-(4'-acetylbenzene-sulphonamido)-5-phenyl-pyrimidine (Examples I and II) were dissolved in 100 milliliters of water by the addition of 1.5 grams of sodium hydroxide. NaBH₄, in amount of 2.6 grams, was then introduced and the solution was stirred overnight at room temperature. On the following day, the excess of NaBH₄ was destroyed by the dropwise addition of glacial acetic acid and the suphonamide was precipitated at the same time, in amount of 8.5 grams of melting point 232° C. and represented by the following formula:

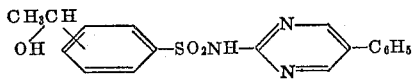

What is claimed is:
1. The chemical compound 2 - (4' - acetylbenzene-sulphonamido)-5-phenyl-pyrimidine.
2. The chemical compound represented by the formula

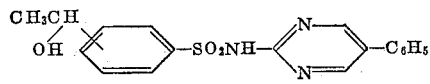

No references cited.

HENRY R. JILES, *Primary Examiner.*
MARY O'BRIEN, *Assistant Examiner.*